March 27, 1928.
W. J. TAYLOR
BEATING AND MIXING DEVICE
Filed Jan. 6, 1925
1,663,961
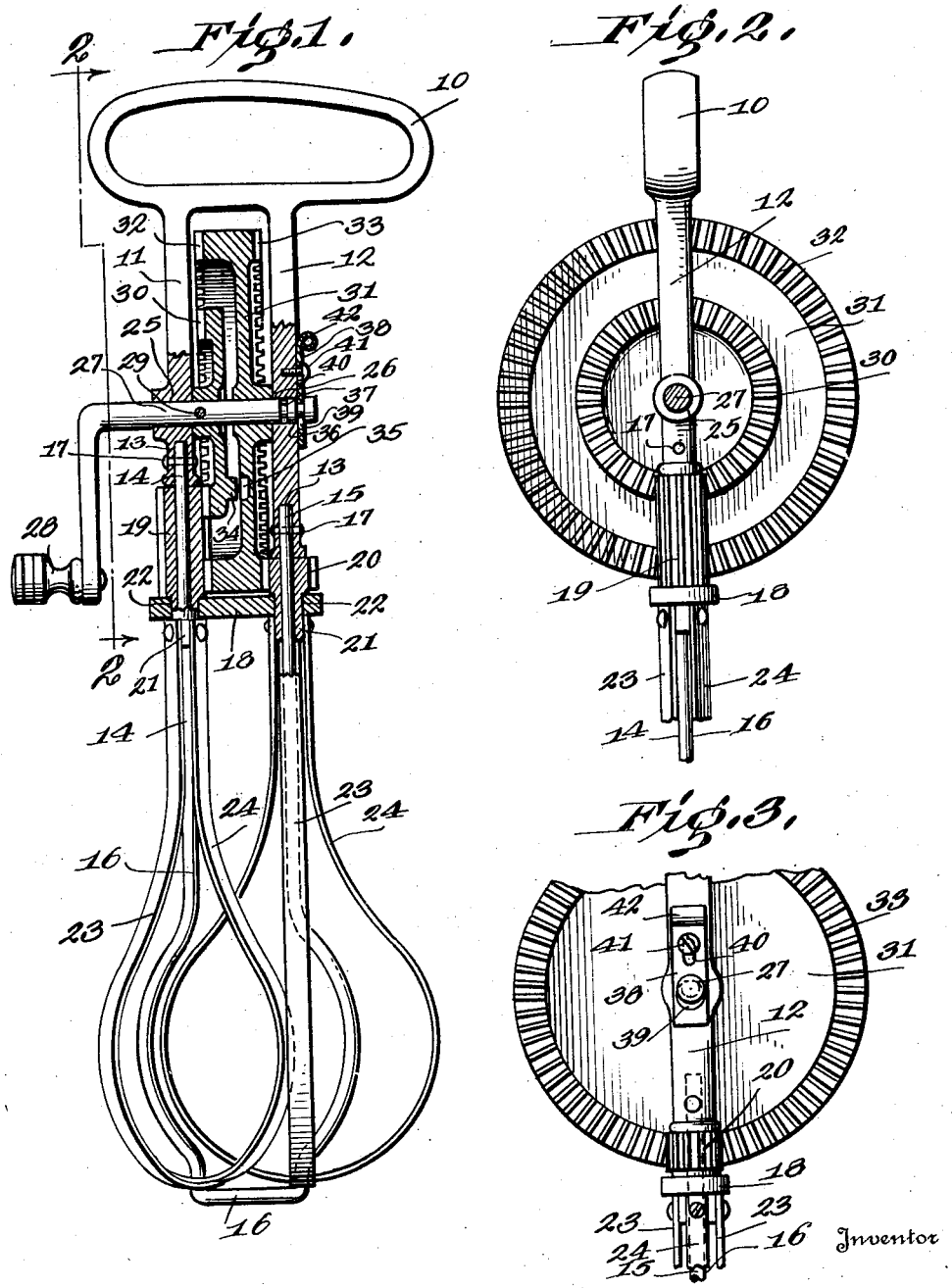

Patented Mar. 27, 1928.

1,663,961

UNITED STATES PATENT OFFICE.

WILLIAM J. TAYLOR, OF NENANA, TERRITORY OF ALASKA.

BEATING AND MIXING DEVICE.

Application filed January 6, 1925. Serial No. 853.

The present invention relates to a beating and mixing device, and aims to provide a novel and improved device of this character which is constructed to permit the changing of the speed of the agitating elements without changing the speed of the operating means for the same, such a device permitting light liquid to be mixed at a high speed, while heavier ones may be mixed or beaten at a lower speed.

Another object of the invention is to provide a plurality of gears and pinions, certain of which are adapted to be moved for changing the speed of the agitating elements, and means arranged for holding said gears that are moved in mesh with others, so that the device may be continually operated at the desired speed.

It is also an object of the invention to provide a device of the kind indicated, which is simple and substantial in construction, which can be manufactured economically, and which will be thoroughly efficient and practical in use.

With the foregoing and other objects in view, which will be apparent as the description proceeds, the invention resides in the construction and arrangement of parts, as hereinafter described and claimed, it being understood that changes can be made within the scope of what is claimed without departing from the spirit of the invention.

The invention is illustrated in the accompanying drawings, wherein:

Figure 1 is a side elevation of my improved device, showing portions thereof in section, Figure 2 is a section on line 2—2 of Figure 1, and Figure 3 is a fragmentary elevation of the device looking at the opposite side of that shown in Figure 2.

In carrying out the invention, the numeral 10 designates a handle for holding the device in the desired position when the same is in use, said handle having a pair of arms 11 and 12 depending therefrom for supporting the driving and agitating means. The arm 11 is slightly shorter than the arm 12 for a purpose which will be better understood as the description proceeds, said arms each having an opening 13 in their lower or free ends for receiving the opposite ends 14 and 15 of a U-shaped wire supporting frame 16, upon which the agitating means are adapted to rotate. The free ends of said frame are secured in the openings 13 by rivets 17, or the like, passing therethrough.

Positioned between the ends of the arms 11 and 12 and a cross plate 18 and pivoted loosely on the opposite ends 14 and 15 of the frame 16 are a pair of pinions 19 and 20 respectively, each having a collar 21 thereon adapted to extend through openings 22 in the plate 18.

A pair of U-shaped agitating elements 23 and 24 are supported on each upwardly extending arm of the U-shaped frame 16, having the portions thereof intermediate their ends pivotally connected to the frame, while their opposite ends extend upwardly and are secured to the collars 21 of the pinions 19 and 20, said agitators being of the construction now commonly in use so that further description thereof will no be needed. It will be noted that by the above referred to construction the pinions 19 and 20 have the agitating elements attached thereto, and that said pinions are free to rotate on the ends 14 and 15 of the frame 16, but said pinions are held against lateral or longitudinal movement with respect to the device.

Each of the arms 11 and 12 have horizontal openings therein, designated by the numerals 25 and 26 respectively, said openings arranged to align with each other for receiving therein and pivotally supporting a drive shaft 27, having a crank handle 28 on one end thereof arranged for rotating same. Secured on the drive shaft 27 by a pin 29 is a gear 30 arranged to mesh with the upper end or portion of the pinion 19, while meshing with the lower end or portion of the pinion 19 is one face of a large, double faced gear 31 loosely mounted on the shaft 27, the face 32 of said large gear meshing with the pinion 19, while the face 33 thereof meshes with the pinion 20. The gear 30 is secured to the shaft 27 in such a manner that said shaft may be slid slightly in a longitudinal direction so as to disengage the gear 30 from the pinion 19, while the large double faced gear 31 is held against sliding movement by the faces 32 and 33 thereof engaging the pinions 19 and 20 respectively. Arranged on the gear 30 is a projection 34 adapted to engage in a notch 35 in the large double faced gear 31 when the gear 30 is moved out of mesh with the pinion 19, so as to transmit rotary movement to the large, double faced gear 31 to drive the pinions 19 and 20. In order to hold the gear 30 in mesh with the pinion 19, or to hold the projection 34 on same in engagement with the notch 35 of the gear 31, a pair of annular grooves 36 and 37 are provided in the shaft 27 and arranged to be engaged in by a portion of a slidable lock bolt 38, said bolt 38 having an opening 39 therein which when properly aligned with the opening 26, the shaft 27 may be slid for shifting the gears, and said bolt also having a slot 40 therein through which extends a pin 41 for guiding the sliding movement of the bolt 38. The upper end of the bolt 38 is rolled upon itself, as at 42, to provide means for permitting engagement with the bolt to slide the same.

In operation, when the gear 30 is in the position indicated in Figure 1, and the crank handle 28 is rotated the gear 30 will rotate the pinion 19 and consequently rotate the agitating elements 23 and 24 carried thereby. Such movement will also rotate the large, double faced gear 31, as the same meshes continually with the pinion 19, which will in turn cause the pinion 20 and agitators carried thereby to rotate at a speed similar to the pinion 19 and agitating element carried by same, thus turning all of the agitators at a low speed. By sliding the bolt 38 upwardly and shifting the crank or drive shaft 27 inwardly, the gear 30 is disengaged from the pinion 19, while the projection 34 on said gear 30 engages in the notch 35 of the large, double faced gear 31, which will cause said large gear to rotate with the shaft 27 and at the same speed. As the large gear 31 has a larger circumference than the gear 30, the agitating elements will make more revolutions by a complete revolution of the crank handle 28, than when the gear 30 was in mesh with the pinion 19.

By the foregoing description it can be seen that certain of said gears may be conveniently and efficiently moved to engage or disengage a pinion to change the amount of revolutions of the agitating elements, while the crank handle 28 is making but one complete revolution.

Having thus described my invention, what I claim as new is:

1. A device of the character described, comprising a main supporting frame, driven shafts carried by said frame, pinions arranged to rotate said driven shafts, a rotatable drive shaft carried by said frame, gears upon said drive shaft, said gears being of a different size, a crank handle for rotating said drive shaft, one of said gears being attached to said drive shaft while the other is loose thereon and engages said pinions, means for permitting said gear attached to said shaft to be moved for engaging or disengaging one of said pinions, and means for locking said movable gear to said other gear when said movable gear disengages the pinion the same is adapted to be brought in engagement with.

2. A device of the character described, comprising a main supporting frame, driven shafts carried by said frame, pinions arranged to rotate said driven shafts, a drive shaft rotatably and slidably supported by said frame, a gear fixed to said drive shaft and adapted to mesh with one of said pinions, a second gear loosely carried by said drive shaft and adapted to continuously mesh with both of said pinions, and means for causing said second mentioned gear to turn with said shaft when said first mentioned gear is moved by the sliding of said drive shaft and disengaged from the pinion the same is arranged to engage with for changing the speed of the agitating elements.

3. A device of the character described, comprising a main supporting frame, driven shafts carried by said frame, pinions arranged to rotate said driven shafts, a drive shaft rotatably and slidably supported by said frame, a gear fixed to said drive shaft and adapted to mesh with one of said pinions, a second gear loosely carried by said drive shaft and adapted to continuously mesh with both of said pinions, means for causing said second mentioned gear to turn with said drive shaft when said first mentioned gear is moved by the sliding of said drive shaft and disengaged from the pinion the same is arranged to engage with for changing the speed of the driven shafts, and means for holding said first mentioned gear and drive shaft in either driving position.

4. A device of the character described, comprising a main supporting frame, a pair of driven shafts carried by said frame, a pinion arranged for driving each of said driven shafts, a drive shaft pivotally and slidably supported by said frame, a small drive gear carried by said drive shaft and adapted to engage one of said pinions for rotating the same at a low speed, a large gear loosely carried by said drive shaft and adapted to continually engage both of said pinions, said large gear having a notch therein, a projection carried by said small gear for engaging in said notch when said small gear and drive shaft are shifted to disengage said small gear from the pinion the same is arranged to engage with, so that said large gear will rotate with the drive shaft and cause said pinions and driven shafts to rotate at a high speed with relation to the turning movement of said drive shaft.

5. A device of the character described, comprising a main supporting frame, a pair of driven shafts carried by said frame, a pinion arranged for driving each of said driven shafts, a drive shaft pivotally and slidably supported by said frame, a small drive gear carried by said drive shaft and adapted to engage one of said pinions for rotating the same at a low speed, a large gear loosely carried by said drive shaft and adapted to continually engage both of said pinions, said large gear having a notch therein, a projection carried by said small gear for engaging in said notch when said small gear and drive shaft are shifted to disengage said small gear from the pinion the same is arranged to engage with, so that said large gear will rotate with the drive shaft and cause said pinions and driven shafts to rotate at a high speed with relation to the turning movement of said drive shaft, said drive shaft having notches therein, and a sliding bolt carried by said frame and adapted to engage in one of said notches to hold said small gear in mesh with the pinion or adapted to engage in another notch to hold said projection carried by said small gear in engagement with the notch in said large gear.

6. A device of the character described comprising a main supporting frame, a pair of driven shafts carried by said main frame, a pair of pinions one pivotally supported upon each driven shaft, depending collars carried by said pinions, a cross plate having openings therein for receiving said collars to rotatably support said pinions, a drive shaft pivotally and slidably supported in said main supporting frame, a large, double-faced gear loosely supported upon said drive shaft and arranged with each face thereof engaging one of said pinions, a small gear rigidly carried by said drive shaft and arranged to engage one of said pinions at the portion thereof nearest said shaft for rotating said pinions and driven shafts at a low rate of speed, and means carried by said small gear for engaging said large gear when said drive shaft is slidably moved in said frame and the small gear is disengaged from the pinion for engaging said large gear so that said large gear will rotate said pinions and driven shafts at a high rate of speed.

In testimony whereof, I have affixed my signature.

WILLIAM J. TAYLOR.